United States Patent Office 3,173,923
Patented Mar. 16, 1965

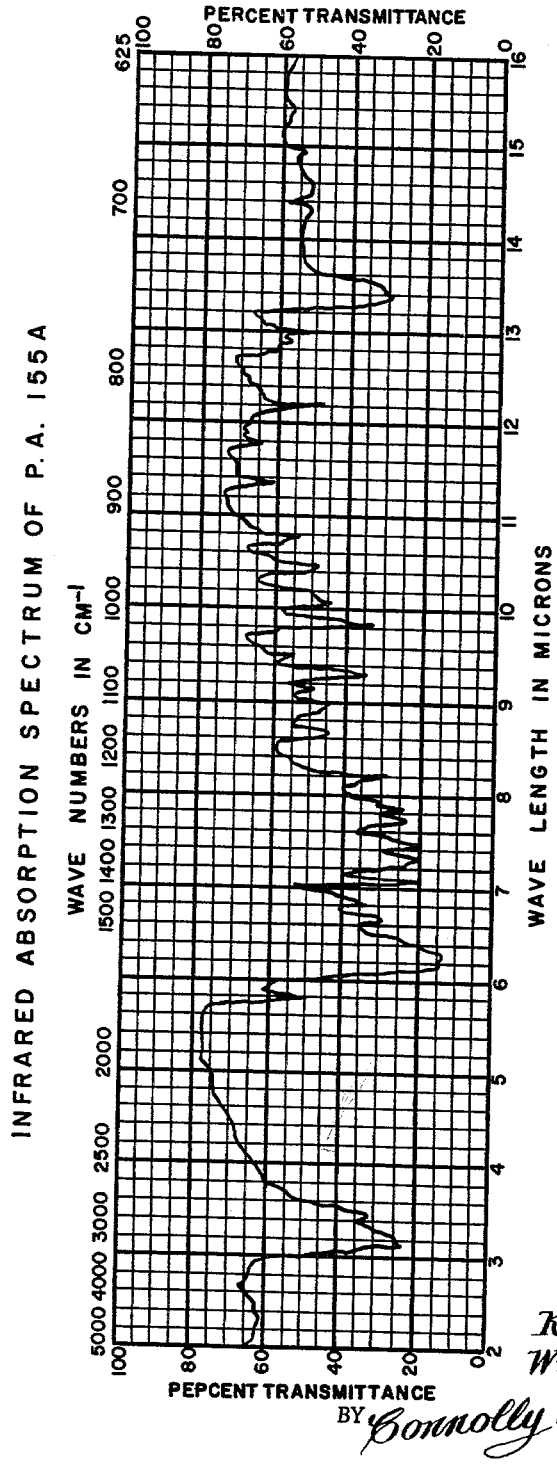

3,173,923
1-(3'-INDOLYL)-1-[5"-(2"-METHYLIMINO)-4"-KETO-OXAZOLIDINYL]ETHANE AND ACID ADDITION SALTS THEREOF
Koppaka V. Rao, Pine Brook, and William S. Marsh, Ringwood, N.J., assignors to Chas. Pfizer & Co., Inc., New York, N.Y., a corporation of Delaware
Filed Apr. 13, 1961, Ser. No. 102,738
2 Claims. (Cl. 260—307)

This application is a continuation-in-part of copending application Serial No. 620,033, filed November 2, 1956, and now abandoned.

This invention is concerned with new and useful antimicrobial agents and with fermentation processes for their production. This series of new antibiotics is known as PA 155A, PA 155B, and PA 155X. Moreover, this invention relates to processes for the production of these antibiotics by fermentation, the methods for their recovery and concentration from crude solutions, including the fermentation broths, methods for their purification, and to certain of these antibiotics in pure crystalline form. This invention includes within its scope the antibiotics PA 155A, PA 155B, and PA 155X as crude concentrates singly and mixed, and in purified forms. Each of these novel products is useful in combating pathogenic microorganisms, including Gram positive and Gram negative bacteria. Each is also useful as a disinfecting agent against pathogenic microorganisms, and in separating mixtures of microorganisms, and in classifying microorganisms for diagnostic research purposes.

These products are formed during the cultivation under controlled conditions of a new strain, isolated from the soil, of a species of microorganism known as *Streptomyces albus*, which was identified by planting and testing cultures thereof on media normally used for identification of such microorganisms, and by observing the growth and/or changes which occur incident thereto. Identification was made by Dr. John B. Routien. A living culture of this strain has been deposited with the American Type Culture Collection in Washington, D.C., as ATCC No. 12,648. The cultural characteristics of this new strain of *Streptomyces albus* are set forth in the following table. The cultural characteristics were recorded after two weeks of incubation at 28° C. on the media specified. The colors where R is written refer to Ridgway's "Color Standards and Nomenclature."

TABLE I

*Cultural characteristics of* Streptomyces albus
*ATCC No. 12,648*

| Medium | Amount of Growth | Aerial Mycelium and Sporulation | Soluble Pigment | Remarks |
|---|---|---|---|---|
| Glucose-Asparagine. | Moderate | Good, white to light gray to grayish-brown, (Pale Smoke Gray to Drab [R]), becoming grayish white at center (Pale Olive Buff [R]). | None | Colonies slightly raised to raised in central area; reverse creamy white to greenish gray, becoming darker greenish gray (Olive Buff to Deep Olive Buff [R]). Spores in straight or wavy chains; some tendency to spirals. Spores subglobose, 0.65–1.00 ×0.65–1.30μ. On dilution plates colonies essentially similar to above description. |
| Skimmed Milk | Poor or poor to moderate. | Rare or sparse, white; ring creamy white to light buff (Pale Ochraceous Buff [R]), with small areas of deeper buff (Light Ochraceous Buff [R]). | Orange-buff (Ochraceous Buff [R]). | Milk hydrolyzed; pH change from pH 6.5 to pH 7.1. |
| Glucose Agar | Good | Good, white to creamy white | Yellowish brown (Cinnamon Buff to Clay Color [R]). | Surface cerebriform at base; deep fissures extending irregularly up one-half to two-thirds of slant, upper part of slant smooth. Vegetative mycelium colorless where visible. |
| Nutrient Agar | Moderate to Good. | Good, white to creamy white | Pale yellowish buff (Colonial Buff [R]). | Surface smooth, dry, reverse creamy white to yellowish buff (Colonial Buff [R]); vegetative mycelium colorless where visible. |
| Synthetic Agar | Moderate | Moderate, thin layer, creamy white | None | Reverse creamy white, essentially no penetration of agar; vegetative mycelium colorless. |
| Calcium Malate Agar. | Moderate to Good. | Good, pale yellowish white (Ivory Yellow to Pale Olive Buff [R]) becoming light gray in areas at base. | Pale yellowish buff (Ivory Yellow [R]). | Reverse creamy white to pale yellowish white, malate digested; vegetative mycelium not visible. |
| Cellulose | No growth | | | |
| Potato Slants | Good | Good, creamy white to pale greenish tan (Pale Olive-Buff [R]). | Greenish gray (Light Grayish Olive to Grayish Olive [R]). | Surface of two tubes almost smooth, other tubes coarsely convoluted with irregularly anastamosing ribs; earthy odor; vegetative mycelium not visible. |
| Starch Plate | Poor to poor to moderate. | Moderate, creamy white to grayish white to beige. | None | Colonies almost flat, raised area in center, margins definite, outline irregular; brown secretion present; no hydrolysis; reverse creamy white. |
| Gelatin Plates | Poor to moderate. | None on four plates, sparse on two plates, yellowish white to white in center of colony. | Essentially none | Waxy, vegetative mycelium yellowish buff to deeper buff (Pale Ochraceous Buff to Light Ochraceous Buff [R]). Zone of liquefaction 1.5 to 2.0 cm. wide. |
| Dextrose-Nitrate broth. | Moderate | Moderate or moderate to good, white | Very pale yellow | Growth mainly at top and bottom of tube. No reduction of nitrate to nitrite. |
| Emerson Agar | Moderate to good. | Good, creamy white to white | Yellowish tan (Clay Color [R]). | Vegetative mycelium colorless where visible; margins finely convoluted, reverse creamy white to yellowish brown (Buckthorn Brown [R]). |

The new strain of *Streptomyces albus* has been shown to differ in a number of its characteristics from that described by Waksman and Lechevalier in "Actinomycetes and Their Antibiotics." These differences are summarized in Table II.

TABLE II

*Differences between S. albus ATCC No. 12,648 and that described by Waksman*

| S. albus ATCC No. 12,648 | S. albus (Waksman and Lechevalier) |
|---|---|
| 1. Slight tendency to spiral formation; spores mostly in straight or wavy chains. | 1. Coiled chains. |
| 2. Aerial mycelium and spores white to creamy white on glucose agar. | 2. Aerial mycelium gray becoming brownish. |
| 3. No reduction of nitrate to nitrite. | 3. Nitrate reduced to nitrite. |

In addition, the new strain of *Streptomyces albus* has been found to be different from that which produces acetopyrrothine, *Streptomyces albus* NRRL 2401, described in U.S. Patent 2,689,854, issued September 21, 1954. These differences are tabulated in Table III. The most notable differences observed were that the new strain produces some soluble pigment, has a darker reverse, and has a darker spore color than does *Streptomyces albus* NRRL 2401.

TABLE III

| S. albus ATCC No. 12,648 | S. albus NRRL 2401 |
|---|---|
| 1. Traces of Pale Vinaceous Fawn (R) where sporulated on glucose-asparagine agar. Faint yellow soluble pigment. | 1. Sporulation Pale Smoke Gray to Drab becoming Pale Olive Buff (R). No soluble pigment. |
| 2. Pale Brownish Vinaceous (R) sporulation on gelatin. Yellow soluble pigment. | 2. Yellowish white to white sporulation. Essentially none. |
| 3. Pale Quaker Drab (R) sporulation of glucose agar. | 3. White to creamy white. |
| 4. Mostly white but some Pallid Mouse Gray (R) sporulation on nutrient agar. | 4. White to creamy white. |
| 5. Light yellowish-brown to dark brown soluble pigment on potato plug. | 5. Light Grayish Olive to Grayish Olive (R) soluble pigment. |
| 6. Sporulation nearly lacking on calcium malate. | 6. Pale yellowish white to light gray. |
| 7. Hydrolysis of starch. | 7. No hydrolysis. |
| 8. Slight Pallid Mouse Gray (R) sporulation on Emerson's; mostly white serial mycelium. | 8. Creamy white to white. |

It is to be understood that the present invention embraces the use not only of the organism of the above description, which is given merely for illustrative purposes, but it also embraces the use of mutants produced from the described organism by means such as X-ray irradiation, ultra violet irradiation, treatment with nitrogen mustards, and the like. It is further to be understood that the invention includes the use of subcultures obtained by various standard microbiological techniques, such as the single colony and single spore isolation methods. Such mutants and/or subcultures may differ in certain respects from the above described strain *Streptomyces albus* ATCC No. 12,648. It also includes use of organisms of this strain isolated from other sources.

In addition to the differences tabulated above, we have found that none of the new antibiotics PA 155A, B, and X is produced by any of the previously known strains of *Streptomyces albus*. Conversely, no acetopyrrothine is obtained when the strain of *Streptomyces albus* employed in the process of the present invention is cultivated under the conditions described in the above patent for the production of acetopyrrothine.

PA 155A has considerable activity against a variety of microorganisms, including both Gram positive and Gram negative bacteria. Its activity is somewhat broader and greater against the Gram positive species. It is active against many species that are pathogenic to man, to animals, and to plants. It is further active against strains of bacteria (such as *Micrococcus pyogenes* var. *aureus*) which are resistant to commonly employed antibiotics such as tetracycline.

PA 155B is also active against both Gram positive and Gram negative bacteria, and so is PA 155X. These two compounds each show a greater activity against *B. subtilis* than against *Staph. aureus*, while PA 155A shows greater activity against *Staph. aureus* than against *B. subtilis*.

Each of the three components PA 155A, PA 155B, and PA 155X is always present in the fermentation broth, although the ratio in which they are formed may be varied somewhat with such factors as the particular medium used and the time of fermentation.

Table IV illustrates the activity of PA 155A against a representative group of microorganisms. These microorganisms were selected for testing because they cause various diseases of humans, veterinary animals, or plants of agricultural value. A number of these organisms are resistant to other known antimicrobial agents. The tests were carried out by the serial dilution technique. According to this technique a nutrient medium was prepared containing the antibiotic PA 155A at a concentration of 100 mcg./ml. Aliquots of this medium were next diluted with various volumes of fresh medium so that tubes containing PA 155A at concentrations of 100, 50, 25, 12.5, 6.25, 3.12, 1.56, 0.78, 0.39, and 0.19 mcg./ml. were obtained. These were inoculated with the test organism, and incubated to determine the extent to which the microorganism grew in the presence of the antibiotic. In this fashion, the minimum inhibitory concentration (MIC) of PA 155A for various test organisms was determined. In those cases where complete inhibition occurred at the lowest concentration employed, that is 0.19 mcg./ml., the results were recorded as MIC 0.19 mcg./ml. Partial inhibition is indicated by the letters pi.

TABLE IV

*Antimicrobial activity in vitro of PA 155A*

| Microorganism: | MIC (mcg./ml.) |
|---|---|
| *Micrococcus pyogenes* var. *aureus* 5 | 1.56. |
| *Erysipelothrix rhusiopathiae* | 100. |
| *Bacillus subtilis* | 3.12. |
| *Listeria monocytogenes* | 3.12. |
| *Bacterium ammoniagenes* | 1.56. |
| *Clostridium perfringens* | 0.78. |
| *Mycobacterium berolinense* | 0.78. |
| *Mycobacterium* 607 | 3.12. |
| Antibiotic resistant *Micrococcus pyogenes* var. *aureus* strains: | |
|    376 | 0.78. |
|    Carbomycin/r | 1.56. |
|    Penicillin/r | 3.12. |
|    M 1 | 0.39 pi. |
|    M 2 | 0.78 pi. |
|    M 12 | 0.39 pi. |
|    M 13 | 0.39. |
|    400 | 0.19 pi. |
|    Erthromycin/r | 1.56. |
|    Oxytetracycline/r | 0.19. |
|    Novobiocin/r | 0.78. |
|    122/r | 3.12. |
| *Aerobacter aerogenes* | 12.5; 6.25 pi. |
| *Escherichia coli* | 12.5; 6.25 pi. |
| *Hemophilus influenzae* | 1.56. |
| *Erwinia amylovora* | 3.12; 1/56 pi. |
| *Malleomyces mallei* | 100 pi. |
| *Vibrio* | 3.12. |
| *Desulfovibrio desulfuricans* | 3.12. |
| *Pasteurella multocida* | 0.19. |

PA 155A is remarkably nontoxic to mice when administered by the oral, intraperitoneal, and subcutaneous routes. It was observed that all of the treated mice survived exposure to doses of 400 mg./kg. of body weight by the subcutaneous and oral routes. By the intraperitoneal route all of the treated mice survived a dose of 200 mg./kg. of body weight.

In addition it was found that PA 155A afforded lifesaving protection to mice infected experimentally with an otherwise lethal dose of tetracycline-resistant strains of *Micrococcus pyogenes* var. *aureus*. These data are summarized in Table V.

TABLE V

| Compound | Route | Dosage, mg./kg. | Percent Survival | |
|---|---|---|---|---|
| | | | *Micrococcus pyogenes* var. *aureus* strain 376 | *Micrococcus pyogenes* var. *aureus* strain K–3 |
| PA 155A | Subcutaneous | 200 | 90 | 90 |
| | | 100 | 80 | 80 |
| | | 50 | 60 | 70 |
| | | 25 | 40 | 50 |
| | | 12 | 30 | 35 |
| | | 6 | 20 | 25 |
| | | 3 | 0 | 0 |
| | Oral | 200 | 80 | 80 |
| | | 100 | 75 | 70 |
| | | 50 | 70 | 55 |
| | | 25 | 40 | 30 |
| | | 12 | 25 | 15 |
| | | 6 | 10 | 5 |
| Tetracycline | Subcutaneous | 200 | 0 | 0 |
| | | 100 | 0 | 0 |
| | | 50 | 0 | 0 |
| | | 25 | 0 | 0 |
| | | 12 | 0 | 0 |
| | | 6 | 0 | 0 |
| | | 3 | 0 | 0 |
| | Oral | 200 | 0 | 0 |
| | | 100 | 0 | 0 |
| | | 50 | 0 | 0 |
| | | 25 | 0 | 0 |
| | | 12 | 0 | 0 |
| | | 6 | 0 | 0 |

It is apparent from Table V that a significant level of protection is provided by PA 155A. For the protection study, two antibiotic resistant strains of *Micrococcus pyogenes* var. *aureus* isolated from clinical cases were employed as the infecting organisms. The mice selected for the test were infected with otherwise lethal doses of the bacterium, and arranged in groups which were treated respectively with various doses of PA 155A. Parallel experiments were carried out using tetracycline as the test drug in order to measure the comparative effectiveness of the two substances. The percent survival of the mice in each group was then calculated and the results tabulated as shown in Table V. PA 155A was found to give a high degree of protection in this test. Tetracycline failed at the 100 and 200 mg./kg. dosage level by either the subcutaneous or oral routes.

This invention also includes processes for producing these new compounds by growing the new strain of *S. albus*. The microorganism may be cultivated at temperatures ranging from about 23° C. to about 32° C. However, it is preferred to use temperatures of from 26° C. to 30° C. The organism is best grown under submerged conditions of agitation and aeration on media containing a carbohydrate source such as sugars, starch and glycerol, and organic nitrogen source such as soy bean meal, cotton seed meal, peanut meal, and corn steep liquor and mineral salts such as sodium chloride, sodium nitrate, magnesium sulfate, and potassium phosphate. In addition to these, a buffering agent such as calcium carbonate or potassium dihydrogen phosphate, and a foam preventer such as vegetable oils or animal oils may be used. The preferred pH range is from about 6 to 7. When the medium is adjusted to this point before fermentation, there is little change during the course of production of the antibiotics. During the fermentation the broths are agitated with stirrers of suitable design for incorporating air into the broth. Aeration at the rate of about ½ to 2 volumes of air per volume of broth per minute produces satisfactory results. About 1 to 3 days are required for the fermentation broths to reach maximum antibiotic potency.

Inoculum for the production of PA 155A, PA 155B, and PA 155X may be obtained by employing a growth from slants or Roux bottles inoculated with *Streptomyces albus* ATCC 12,648. Suitable solid media for this initial growth are beef-lactose or Emerson's agar. This growth is used to inoculate either flasks or inoculum tanks. The time required to reach maximum growth will vary somewhat, but in general from about ½ to 3 days are sufficient. When inoculum tanks are used, the final broth containing a large amount of mycelium is used to inoculate the large fermenters. Of course, aseptic technique is used throughout to avoid contamination of the batch by undesired organisms.

The progress of antibiotic production is conveniently followed during fermentation by biological assay of the broth employing *Staphylococcus aureus* 209P. Standard plate assay technique is employed in which the zone of inhibition surrounding a filter paper disc saturated with the broth is used as a measure of antibiotic potency. After the fermentation broth has reached a suitable antibiotic potency, the mycelium is filtered, ordinarily without pH adjustment. A diatomaceous aid such as Super Cel greatly facilitates the filtration. Various types of equipment may be employed, for instance filter presses, centrifuges, etc. The filtered broth may be used as such, or it may be spray dried to give a product which is useful for local application on plants or animals or in animal feeds. However, it is preferred to purify the material to some extent before using it therapeutically.

Paper chromatography is convenient for analyzing the composition of crude materials which contain the PA 155 components in a ratio varying with the procedures of fermentation and recovery. A number of solvent systems have been used for the analysis of crude prepartions or broths by paper chromatography. One useful system employs Whatman No. 4 filter paper saturated with a 50% solution of formamide in methanol as the stationary phase, and a 3:1 solvent mixture of chloroform and ethyl acetate saturated with formamide as the mobile phase. This system yields the R$f$ values of 0.3 for PA 155A, 0.9 for PA 155B, and about 0.5 for PA 155X.

The location of the fractions on the papergrams is determined by parallel bacterial plate assays. Duplicate papergrams employing two different test species after development are placed on the agar plates of nutrient media each inoculated with one of the test organisms. *B. subtilis* and *Staph. aureus* 209P have been found useful since PA 155A is more active against the Staphylococcus and its location can be determined with more assurance using this species. Similarly the B and X components appear to be more active against *B. subtilis*. Use of the two assay systems thus affords greater accuracy to the method.

The antibiotic products are recovered from the filtered fermentation broth by a number of different procedures, including solvent extraction and column chromatography or combinations thereof.

PA 155X is a more hydrophilic substance than PA 155A and 155B. It is not readily extracted from the broth by such solvents as ethyl acetate or methyl isobutyl ketone. It is best recovered by an ion exchange method such as that described below, although n-butanol will extract some of it from the filtered broth.

Various organic solvents are useful to extract PA 155A and 155B from the filtered broth. Chloroform and methylene chloride each work, but not so well as n-butanol. Ethyl acetate is preferred to all of these, because it has the advantage of not extracting the PA 155X, thereby accomplishing a separation of this antibiotic from the others.

Solvent extraction is preferably carried out using a volume of solvent approximately equal to the volume of broth from which it is desired to recover the antibiotic. It is often convenient to use two extractions, each with the volume of solvent being about ½ the volume of the broth. Equipment such as separatory funnels, stirred tanks, and mechanical extracting devices, e.g. centrifugal separators is helpful during the extractions.

One procedure which is satisfactory for obtaining an amorphous solid concentrate of the antibiotics PA 155A and PA 155B involves solvent extraction of the filtered broth with ethyl acetate, concentration, preferably under reduced pressure, of the extract to 1/50 or 1/100 the original volume, and precipitation of the product from the concentrate with several volumes of a non-solvent such as petroleum ether. The cream-colored solid so obtained represents most of the antibiotic activity due to PA 155A and PA 155B and corresponds to about 200 mg./ml. of broth. Purified products are obtainable from such concentrates, either the solvent concentrate or the precipitated amorphous solid, by column chromatography on acid-washed alumina.

The preferred method of recovery for PA 155A and PA 155B is as follows. The filtered broth is extracted by shaking it with an equal volume of ethyl acetate. The extract is concentrated under reduced pressure to remove almost all the solvent, and the residue is then subjected to countercurrent distribution between benzene-methanol and water in a 2:1:1 ratio by volume. The PA 155A follows the aqueous phase, while the PA 155B follows the organic phase. The phases are separated, the solvents evaporated, and the separated PA 155A and 155B recovered as solid residues.

For the recovery of PA 155X, the preferred method is as follows. The filtered broth is passed through a strongly acid cation exchange resin in the hydrogen form. These resins may be, for example, of the phenolic methylene sulfonic type, the nuclear sulfonic type or the sulfonated coal type, such as are described in U.S. Patents 2,191,853; 2,366,007, 2,518,420; BIOS Report 621, item 22 (1946); and U.S. Bureau of Mines Report of Investigations, No. 3559 (1941), by Broderick and Bogard. Amberlite IR-120 is a satisfactory example of such a resin. The PA 155X passes through it unadsorbed. The acidic effluent is then neutralized by passing it through a weakly basic anion exchange resin in the hydrogen form, for instance, a resin of the modified amine type such as described in U.S. Patent 2,591,573. Amberlite IR-4B is a satisfactory resin for this purpose. The final effluent is concentrated and freeze-dried, leaving a solid residue of PA 155X.

The novel antibiotics of this invention are useful in a variety of dosage forms, singly or in mixtures, with each other or in combinations with other active ingredients. The composition of pharmaceutical dosage forms is readily determined by the desired route of administration, the solubility and stability of the compound, and the standard practices of pharmacy. In general tablets conveniently comprise inert excipients such as starch, milk sugar, and certain clays, and liquid preparations often contain coloring and sweetening agents. The determination of dosage is within the skill of the physician and will of course vary with the illness being treated. The usual dosage of antibiotic is generally of the order of magnitude of one half to three grams a day for the average adult. All such dosage forms comprising a novel compound of this invention are within the scope of this invention.

The following examples are given solely for the purpose of illustration and are not to be construed as limitations of this invention, many variations of which are possible without departing from the spirit or scope thereof.

EXAMPLE I

A sterile, aqueous medium having the following composition was prepared.

| | Grams/liter |
|---|---|
| Dextrose hydrate | 10 |
| Distiller's solubles | 2.5 |
| Soybean meal | 15 |
| Dibasic potassium phosphate | 5 |
| Sodium chloride | 2 |
| Calcium carbonate | 2 |

A slant culture of *Streptomyces albus* 12,648 was transferred to 100 ml. of this medium in a 300 ml. Erlenmeyer flask and shaken 48 hours until good growth was obtained. Inoculum for a larger fermentation was prepared by transferring the contents of the aforesaid flask under aseptic conditions to one liter of the same medium in a 3 liter flask and shaking the same for 48 hours.

Fifty gallons of sterile nutrient medium having the above composition was prepared and inoculated with the inoculum thus prepared. The temperature was maintained at 28° C. and the broth was stirred and aerated at the rate of 1 volume of air per volume of broth per minute. After 48 hours, the broth was filtered. The filtered broth was divided into two parts.

One part of the filtered broth was passed through an ion exchange column of Amberlite IR-120 in the hydrogen form. The effluent was then passed through an ion exchange column of Amberlite IR-4B, in the hydrogen form. The effluent was concentrated and freeze dried. A solid residue of PA 155X was recovered in this fashion. PA 155X is an essentially netural or very weakly acid compound. It is very soluble in water, and insoluble in ethyl acetate, methyl isobutyl ketone, chloroform and ethylene chloride, and slightly soluble in n-butanol. In minute amounts, it is effective in inhibiting the growth of Gram positive and Gram negative bacteria, particularly the organism *B. subtilis*. It shows no maxima in the ultraviolet region.

The other part of the filtered broth was extracted twice, each time with one half its volume of ethyl acetate. The ethyl acetate extracts were combined, and concentrated under reduced pressure to remove almost all of the solvent. The residue was then subjected to countercurrent distribution between benzene-methanol and water in the ratio of 2:1:1 by volume. The PA 155A was covered from the aqueous phase and the PA 155B was recovered from the organic phase.

The compound PA 155B was recovered as a colorless to light tan solid from the countercurrent distribution separation. It is an essentially neutral compound and is readily soluble in the common organic solvents except aliphatic hydrocarbons. It gives no color with ferric chloride and a negative indole test. It shows no characteristic maxima in the ultraviolet region. It is effective in inhibiting the growth of Gram positive and Gram negative organisms, particularly the organism *B. subtilis*.

The PA 155A obtained as described above was recrystallized four times from methanol and methanol-ethyl acetate mixtures and the crystalline material was dried for four hours at 80° C. under 0.05 mm. of mercury pressure.

PA 155A occurs as colorless rectangular prisms melting at 213° C. The compound is sparingly soluble in water and common organic solvents such as chloroform, ether, ethyl acetate and benzene. It is more soluble in acetone and lower alcohols. It is a weakly basic compound. Titration with perchloric acid in glacial acetic acid proceeded smoothly and showed one break in the titration curve. From this titration, an equivalent weight of 253 was calculated.

PA 155A gives no characteristic coloration with ferric chloride in alcohol nor in acetone, with ninhydrin, concentrated sulfuric acid, or aqueous sodium hydroxide. It decolorizes bromine water and potassium permanganate.

It gives a positive Hopkins-Cole test characteristic of indole derivatives. It forms a picrate in aqueous or ether solution. The picrate crystallizes as orange-yellow, thin, rectangular plates, melting at 148° C., and appearing to contain two molecules of picric acid for each molecule of PA 155A. The antibiotic also forms salts with both organic and inorganic acids, such as phosphoric, nitric, sulfuric, tartaric, glycolic, citric, gluconic, malic, maleic, succinic, glutaric, acetic and benzoic. The hydrochloride is precipitated from an ether solution of PA 155A by the addition of alcoholic hydrogen chloride. The salts of PA 155A possess antimicrobial activity.

PA 155A is optically active, having a rotation of $[\alpha]_D^{25} = -214°$ (c. 2%, methanol). Its ultraviolet absorption spectrum in methanol shows maxima at 218, 273, 281 and 288 m$\mu$, with $$E_{1\,cm.}^{1\%}$$

values of 1960, 200, 233, and 186 respectively.

Analyses of crystalline PA 155A gave the following average proportions:

| | Percent |
|---|---|
| Carbon | 65.7. |
| Hydrogen | 6.0. |
| Nitrogen | 16.2. |
| Oxygen | 12.1 (by difference). |
| C—CH$_3$ | 5.44. |

The compound PA 155A has been assigned the molecular formula $C_{14}H_{15}N_3O_2$. Its structure has been determined to be

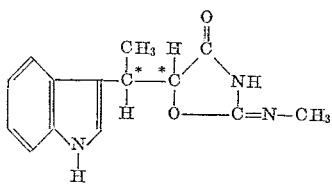

This can be named:

1-(3'-indolyl)-1-[5"-(2" - methylimino)-4"-keto-oxazolidinyl]ethane, or
3-[1'-(5"-(2" - methylimino - 4" - keto) - oxazolidinyl)-ethyl]indole, or
2-methylimino - 4 - keto-5-[1'-(3"-indolyl)ethyl]oxazolidine.

It will be noted that two asymmetric carbon atoms are present, indicated by asterisks, giving rise to epimeric forms of the product. PA-155A preponderates in the trans-configuration which is generally the form having more antimicrobial activity.

PA 155A has been exposed to heat at 100° C. for one hour at the pH range from 2–8 and found to be stable. The trans form can be separated from its isomer by crystallization of the isomer from ethyl acetate or by paper chromatography.

In a potassium bromide pellet at 2% concentration, PA 155A exhibited the following more prominent infrared peaks: 3.20, 3.36, 3.46, 5.82, 6.15 to 6.35, 6.67, 6.84 to 6.93, 7.08, 7.30, 7.46, 7.75, 7.86, 7.94, 8.20, 8.67, 8.91, 9.01, 9.16, 9.29, 9.53, 9.85, 10.09, 10.46, 10.78, 11.36, 11.81, 12.22, 12.81, 12.93, 13.04, 13.38, 13.42, and 13.47 to 13.56 microns. The infrared spectrum of PA 155A is illustrated in the attached drawing.

EXAMPLE II

An experiment was conducted as described in Example I, except that the following nutrient medium was employed.

| | Grams/l. |
|---|---|
| Dextrose hydrate | 10 |
| Phytone (papain digest of soy bean meal) | 10 |
| Sea salt | 5 |
| Yeast extract | 2 |

The results were the same as those in Example I, except that this medium was found to be particularly good for the production of PA 155X, especially when the time of fermentation was limited to 24 hours.

What is claimed is:

1. A substance selected from the group consisting of 1-(3'-indolyl)-1-[5"-(2" - methylimino)-4"-keto-oxazolidinyl] ethane, having the formula

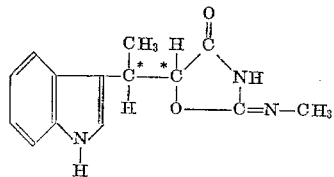

and the pharmaceutically acceptable acid salts thereof.

2. 1-(3'-indolyl) - 1 - [5"-(2"-methylimino)-4"-keto-oxazolidinyl] ethane, having the formula

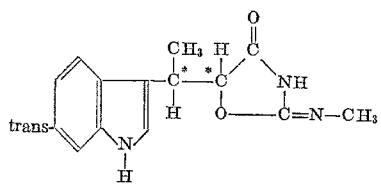

References Cited by the Examiner
UNITED STATES PATENTS

| 2,885,326 | 5/59 | Churchill | 195—80 |
| 2,918,473 | 12/59 | Sherman | 260—307 |
| 2,928,840 | 3/60 | Shapiro et al. | 260—307 |

OTHER REFERENCES

Marsh et al.: Antibiotics and Chemotherapy, vol. 10, pages 316–320 (1960).

Rao: Antibiotics and Chemotherapy, vol. 10, pages 312–15 (1960).

Von Wittenau et al.: J. Am. Chem. Soc., vol. 83, pages 4678–80 (1961).

IRVING MARCUS, *Primary Examiner*.

D. T. McCUTCHEN, WALTER A. MODANCE,
*Examiners*.